(12) United States Patent
Shanmugam et al.

(10) Patent No.: US 11,526,550 B2
(45) Date of Patent: Dec. 13, 2022

(54) SYSTEM FOR BUILDING DATA COMMUNICATIONS USING DATA EXTRACTED VIA FREQUENCY-BASED DATA EXTRACTION TECHNIQUE

(71) Applicant: BANK OF AMERICA CORPORATION, Charlotte, NC (US)

(72) Inventors: Maruthi Shanmugam, Mckinney, TX (US); Nishant Shah, Indian Land, SC (US); Benjamin Moore, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 148 days.

(21) Appl. No.: 17/021,712

(22) Filed: Sep. 15, 2020

(65) Prior Publication Data

US 2022/0083595 A1    Mar. 17, 2022

(51) Int. Cl.
| | |
|---|---|
| *G06F 16/00* | (2019.01) |
| *G06F 16/901* | (2019.01) |
| *G06F 16/9032* | (2019.01) |
| *G06F 16/908* | (2019.01) |
| *G06F 16/9038* | (2019.01) |

(52) U.S. Cl.
CPC ......... *G06F 16/901* (2019.01); *G06F 16/908* (2019.01); *G06F 16/9038* (2019.01); *G06F 16/90332* (2019.01)

(58) Field of Classification Search
CPC ............ G06F 16/901; G06F 16/90332; G06F 16/9038; G06F 16/908
See application file for complete search history.

(56) References Cited

U.S. PATENT DOCUMENTS

| | | |
|---|---|---|
| 7,797,146 B2 | 9/2010 | Harless et al. |
| 8,959,060 B2 | 2/2015 | Carmichael |
| 8,995,774 B1 | 3/2015 | van Deventer et al. |
| 9,009,201 B2 | 4/2015 | Jacobson et al. |
| 9,298,780 B1 | 3/2016 | Madhani et al. |
| 9,336,332 B2 | 5/2016 | Davis et al. |
| 9,373,030 B2 | 6/2016 | van Deventer et al. |
| 9,501,696 B1 | 11/2016 | Caban et al. |
| 10,109,297 B2 | 10/2018 | Brown et al. |
| 10,176,211 B2 | 1/2019 | Wright et al. |
| 10,191,974 B2 | 1/2019 | Indeck et al. |
| 10,467,465 B2 | 11/2019 | Shustorovich et al. |
| 10,922,766 B2 | 2/2021 | Cook |
| 10,922,767 B2 | 2/2021 | Cook |
| 2003/0135445 A1* | 7/2003 | Herz ............... G06Q 40/04 705/37 |

(Continued)

*Primary Examiner* — Syed H Hasan
(74) *Attorney, Agent, or Firm* — Moore & Van Allen PLLC; Nicholas C. Russell (57) ABSTRACT

Embodiments of the present invention provide a system for building intelligent data communications. The system is configured for performing frequency based extraction of data from at least one entity data source, indexing the data extracted from the at least one entity data source, in response to indexing the data, correlating the data extracted from the at least one entity data source, receiving a data input from a user, in response to receiving the data input, generating at least one data output based on indexed and correlated data, and presenting the at least one data output to the user.

17 Claims, 5 Drawing Sheets

(56) References Cited

U.S. PATENT DOCUMENTS

| | | | |
|---|---|---|---|
| 2004/0071368 A1* | 4/2004 | Chadha | G06F 16/50 |
| | | | 382/232 |
| 2008/0065597 A1* | 3/2008 | Vedula | G06F 16/22 |
| 2008/0082490 A1* | 4/2008 | MacLaurin | G06F 16/951 |
| 2008/0109441 A1* | 5/2008 | Stephens | G06F 16/951 |
| 2009/0049038 A1* | 2/2009 | Gross | G06F 16/9535 |
| | | | 707/999.005 |
| 2009/0228264 A1 | 9/2009 | Williams et al. | |
| 2009/0282022 A1* | 11/2009 | Bennett | G06F 3/0482 |
| | | | 707/999.005 |
| 2011/0078105 A1 | 3/2011 | Wallace | |
| 2011/0213642 A1 | 9/2011 | Makar et al. | |
| 2011/0282664 A1 | 11/2011 | Tanioka et al. | |
| 2012/0078891 A1 | 3/2012 | Brown et al. | |
| 2012/0221502 A1 | 8/2012 | Jerram et al. | |
| 2013/0124492 A1* | 5/2013 | Gao | G06F 40/232 |
| | | | 707/706 |
| 2015/0325133 A1* | 11/2015 | Gaglani | G09B 7/00 |
| | | | 434/322 |
| 2019/0171900 A1 | 6/2019 | Thrasher et al. | |

* cited by examiner

SYSTEM FOR BUILDING DATA COMMUNICATIONS USING DATA EXTRACTED VIA FREQUENCY-BASED DATA EXTRACTION TECHNIQUE

BACKGROUND

Conventional systems do not have the ability to provide accurate and relevant data outputs for a given data input. As such, there exists a need for a system for building intelligent data communications.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for building intelligent data communications. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention performs frequency based extraction of data from at least one entity data source, indexes the data extracted from the at least one entity data source, in response to indexing the data, correlates the data extracted from the at least one entity data source, receives a data input from a user, in response to receiving the data input, generates at least one data output based on indexed and correlated data, and presents the at least one data output to the user.

In some embodiments, the present invention performs frequency based extraction of data further comprises identifying usage of data, determining modification date associated with the data, and determining timing associated with creation of the data.

In some embodiments, the present invention verifies the authenticity of the data extracted from the at least one entity data source.

In some embodiments, the present invention verifies the authenticity of the data based on comparing the data extracted from the at least one entity data source with similar data extracted from other entity data sources.

In some embodiments, the present invention compares the data extracted from the at least one entity data source with similar data extracted from the other entity data sources based on the usage, the modification date, the timing of creation associated with the data.

In some embodiments, the present invention in response to receiving the data input, cleanses the data input, determines a token associated with the data input based on one or more trained models, and relates the token with the correlated and indexed data to generate the at least one data output.

In some embodiments, the present invention in response to presenting the at least one data output to the user, receives a second data input from the user, generates a second data output for the second data input based on the indexed and correlated data, and presents the second data input to the user.

In some embodiments, the present invention generates the at least one data output based on applying an intelligent logic.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "entity" may include any organization that performs day to day organizational activities that comprise saving, transferring, and/or transforming data. In one embodiment, the entity may be an organization that processes financial transactions including, but not limited to, banks, credit unions, savings and loan associations, investment companies, stock brokerages, insurance companies and the like. Furthermore, embodiments of the present invention use the term "user." It will be appreciated by someone with ordinary skill in the art that the user may be any user using the system of the present invention. In some embodiments, the user may be an employee of the organization. In accordance with embodiments of the invention, the term "customer" may represent any customer or potential customer of the organization.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more resources or portions of a resource. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

A "system environment", as used herein, may refer to any information technology platform of an enterprise (e.g., a national or multi-national corporation) and may include a multitude of servers, machines, mainframes, personal computers, network devices, front and back end systems, database system and/or the like.

Figure 1:
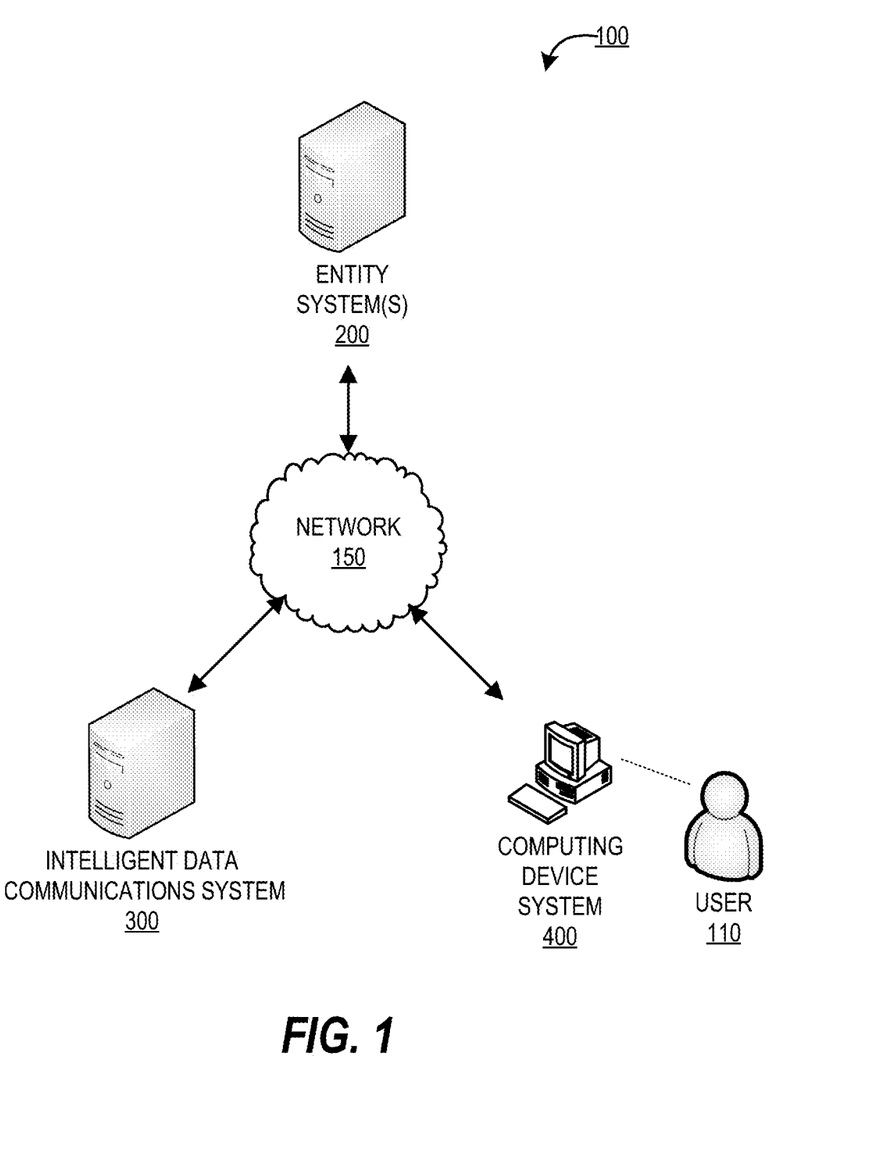
FIG. 1 provides a block diagram illustrating a system environment for building intelligent data communications, in accordance with an embodiment of the invention.

FIG. 1 provides a block diagram illustrating a system environment 100 for building intelligent data communications, in accordance with an embodiment of the invention. As illustrated in FIG. 1, the environment 100 includes an intelligent data communications system 300, one or more entity systems 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees of an entity associated with the one or more entity systems 200.

The entity system(s) 200 may be any system owned or otherwise controlled by an entity to support or perform one or more process steps described herein. In some embodiments, an entity may be any organization that stores, transforms, and/or transfers data. Data as described herein may include, but is not limited to, documents, images, files, spreadsheets, application related data, or the like. In some embodiments, the managing entity is a financial institution. In some embodiments, the one or more entity systems 200 may include one or more servers.

The intelligent data communications system 300 is a system of the present invention for performing one or more process steps described herein. In some embodiments, the intelligent data communications system 300 may be an independent system. In some embodiments, the intelligent data communications system 300 may be a part of the one or more entity systems 200.

The intelligent data communications system 300, the one or more entity systems 200, and/or the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the intelligent data communications system 300 is configured to communicate information or instructions with the one or more entity systems 200, and/or the computing device system 400 across the network 150.

The computing device system 400 may be a system owned or controlled by the entity of the one or more entity systems 200, the user 110, and/or a third party. As such, the computing device system 400 may be a computing device of the user 110. In general, the computing device system 400 communicates with the user 110 via a user interface of the computing device system 400, and in turn is configured to communicate information or instructions with the intelligent data communications system 300, and/or one or more entity systems 200 across the network 150.

Figure 2:
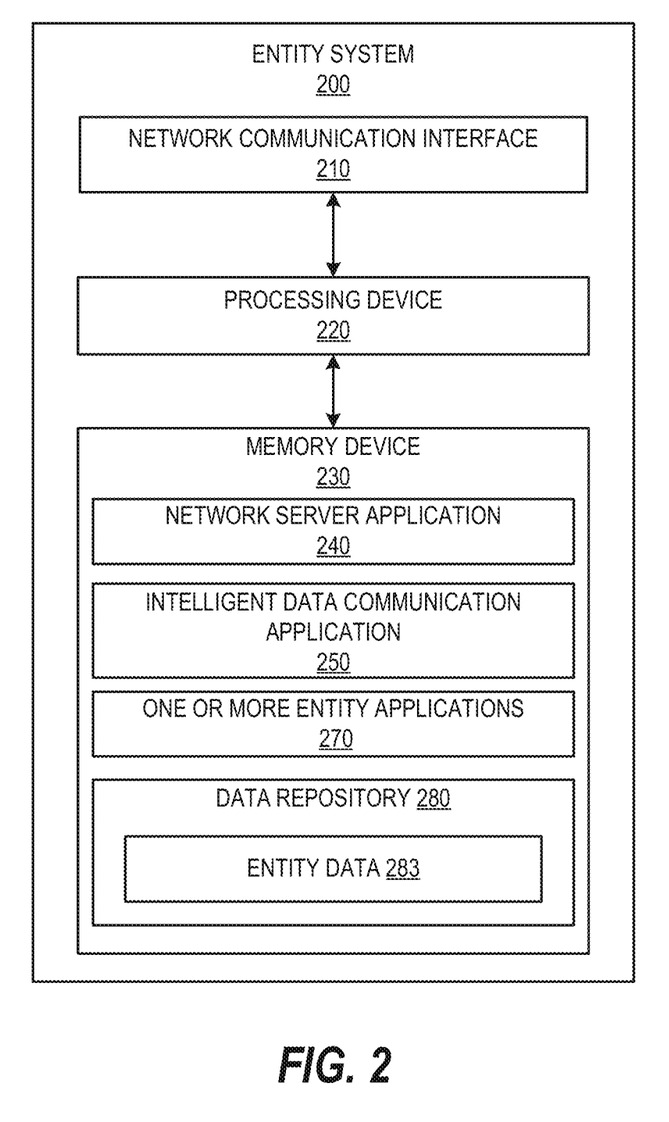
FIG. 2 provides a block diagram illustrating the one or more entity systems 200 of FIG. 1, in accordance with an embodiment of the invention.

FIG. 2 provides a block diagram illustrating the one or more entity systems 200, in greater detail, in accordance with embodiments of the invention. As illustrated in FIG. 2, in one embodiment of the invention, the one or more entity systems 200 includes one or more processing devices 220 operatively coupled to a network communication interface 210 and a memory device 230. In certain embodiments, the one or more entity systems 200 is operated by a first entity, such as a financial institution, while in other embodiments, the one or more entity systems 200 is operated by an entity other than a financial institution. In some embodiments, each of the one or more entity systems may be located physically in separate places and may be connected via an internal entity network. In such embodiments, the one or more entity systems may be It should be understood that the memory device 230 may include one or more databases or other data structures/repositories. The memory device 230 also includes computer-executable program code that instructs the processing device 220 to operate the network communication interface 210 to perform certain communication functions of the one or more entity systems 200 described herein. For example, in one embodiment of the one or more entity systems 200, the memory device 230 includes, but is not limited to, an intelligent data communications application 250, one or more entity applications 270, and a data repository 280 comprising entity data 283. The computer-executable program code of the network server application 240, the intelligent data communications application 250, the one or more entity applications 270, to perform certain logic, data-extraction, and data-storing functions of the one or more entity systems 200 described herein, as well as communication functions of the one or more entity systems 200.

The network server application 240, the intelligent data communications application 250, the one or more entity applications 270, are configured to store data in the data repository 280 or to use the data stored in the data repository 280 when communicating through the network communication interface 210 with the intelligent data communications system 300, and/or the computing device system 400 to perform one or more process steps described herein. In some embodiments, the one or more entity systems 200 may receive instructions from the intelligent data communications system 300 via the intelligent data communications application 250 to perform certain operations. The intelligent data communications application 250 may be provided by the intelligent data communications system 300. The one or more entity applications 270 may be any of the applications used, created, modified, and/or managed by the one or more entity systems 200.

Figure 3:
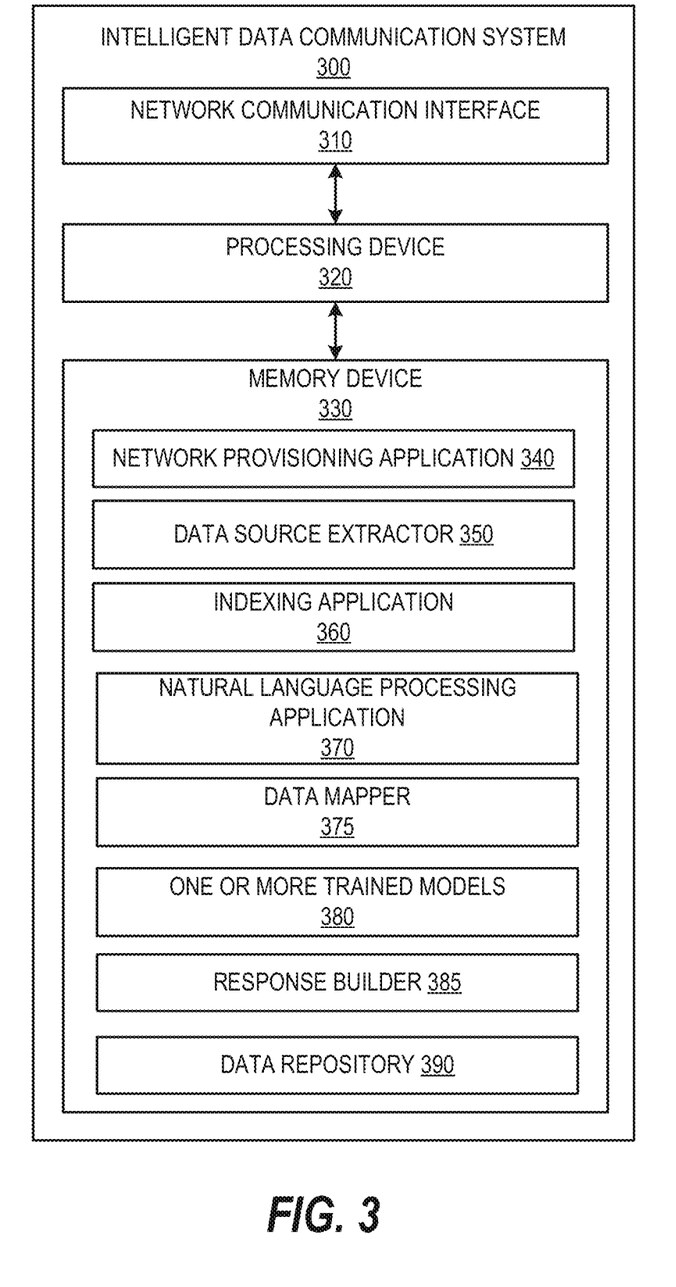
FIG. 3 provides a block diagram illustrating an intelligent data communications system 300 of FIG. 1, in accordance with an embodiment of the invention.

FIG. 3 provides a block diagram illustrating the intelligent data communications system 300 in greater detail, in accordance with embodiments of the invention. As illustrated in FIG. 3, in one embodiment of the invention, the intelligent data communications system 300 includes one or more processing devices 320 operatively coupled to a network communication interface 310 and a memory device 330. In certain embodiments, the intelligent data communications system 300 is operated by a first entity, such as a financial institution, while in other embodiments, the intelligent data communications system 300 is operated by an entity other than a financial institution. In some embodiments, the intelligent data communications system 300 is owned or operated by the entity of the one or more entity systems 200. In some embodiments, the intelligent data communications system 300 may be an independent system configured to operate by communicating with the one or more entity systems 200. In alternate embodiments, the intelligent data communications system 300 may be a part of the one or more entity systems 200.

It should be understood that the memory device 330 may include one or more databases or other data structures/repositories. The memory device 330 also includes computer-executable program code that instructs the processing device 320 to operate the network communication interface 310 to perform certain communication functions of the intelligent data communications system 300 described herein. For example, in one embodiment of the intelligent data communications system 300, the memory device 330 includes, but is not limited to, a network provisioning application 340, a data source extractor 350, a indexing application 360, a natural language processing application 370, a data mapper 375, one or more trained models 380, a response builder 385, and a data repository 390 comprising data processed or accessed by one or more applications in the memory device 330. The computer-executable program code of the network provisioning application 340, the data source extractor 350, the indexing application 360, the natural language processing application 370, the data mapper 375, the one or more trained models 380, and the response builder 385 may instruct the processing device 320 to perform certain logic, data-processing, and data-storing functions of the intelligent data communications system 300 described herein, as well as communication functions of the intelligent data communications system 300.

The network provisioning application 340, the data source extractor 350, the indexing application 360, the natural language processing application 370, the data mapper 375, the one or more trained models 380, and the response builder 385 are configured to invoke or use the data in the data repository 390 when communicating through the network communication interface 310 with the one or more entity systems 200, and/or the computing device system 400. In some embodiments, the network provisioning application 340, the data source extractor 350, the indexing application 360, the natural language processing application 370, the data mapper 375, the one or more trained models 380, and the response builder 385 may store the data extracted or received from the one or more entity systems 200 and the computing device system 400 in the data repository 390. In some embodiments, the network provisioning application 340, the data source extractor 350, the indexing application 360, the natural language processing application 370, the data mapper 375, the one or more trained models 380, and the response builder 385 may be a part of a single application. The data source extractor 350 extracts data from one or more different sources (e.g., one or more entity systems 200), using the frequency based extraction technique. The indexing application 360 indexes the data extracted from the one or more different sources that allows quick and efficient retrieval of data. The natural language processing application 370 processes the data extracted from the one or more different sources and also processes the incoming data inputs/requests. The one or more trained models 380 may be used to identify one or more tokens in the incoming data inputs/requests. The data mapper 375 identifies tokens within an incoming data input and maps the token with the data extracted from the one or more data sources. The response builder 385 generates one or more data responses based on the information identified by the data mapper 375. The functionalities of the data source extractor 350, the indexing application 360, the natural language processing application 370, the data mapper 375, the one or more trained models 380, and the response builder 385 are explained in greater detail in FIG. 5.

Figure 4:
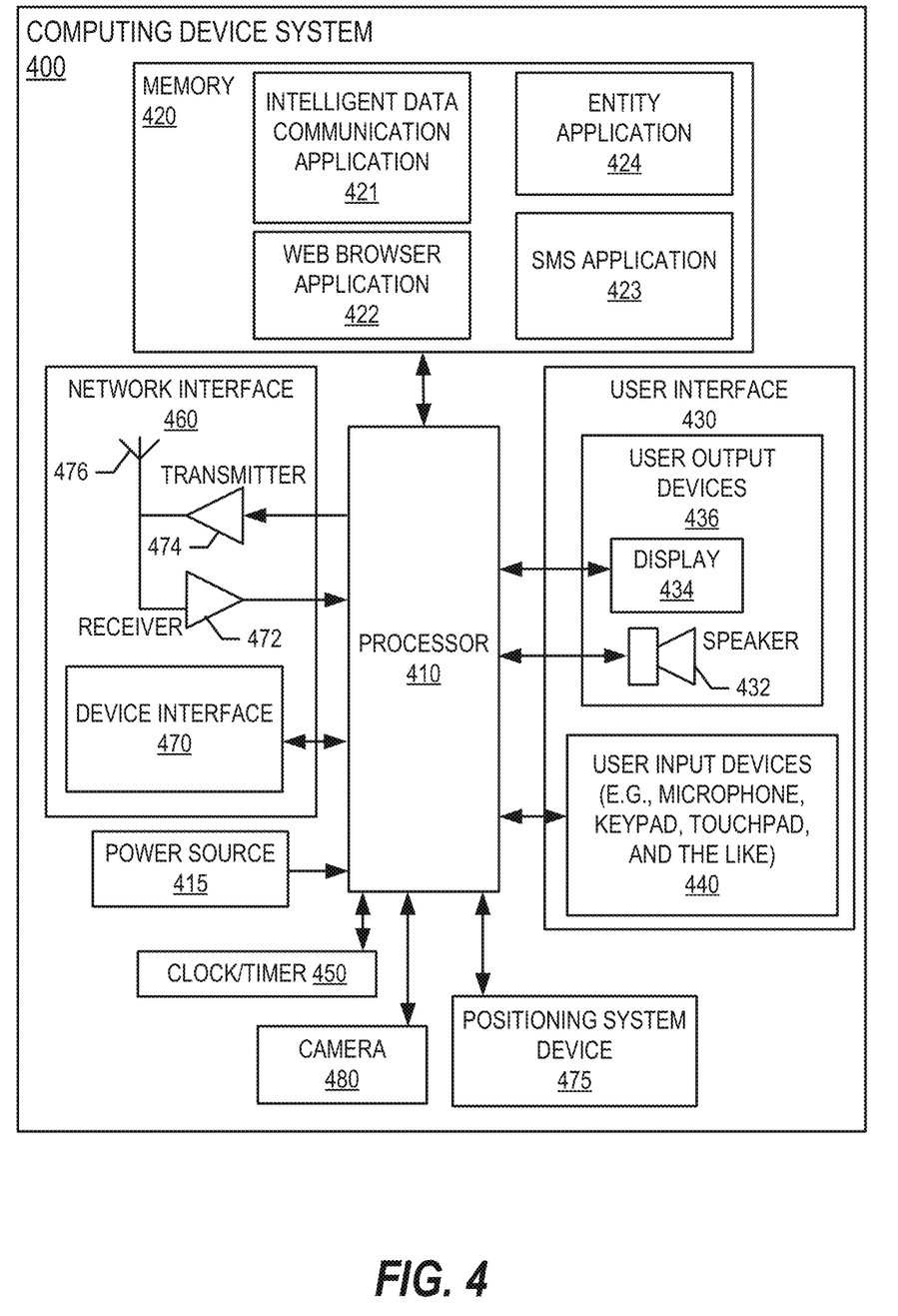
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an intelligent data communication application 421, entity application 424. These applications also typically instructions to a graphical user interface (GUI) on the display 430 that allows the user 110 to interact with the one or more entity systems 200, the intelligent data communications system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the intelligent data communication application 421 provided by the intelligent data communications system 300 allows the user 110 to access the intelligent data communications system 300. In some embodiments, the entity application 424 provided by the one or more entity systems 200. In some embodiments, the entity application 424 may be an online banking application. In some embodiments, the intelligent data communication application 421 allow the user 110 to access the functionalities provided by the intelligent data communications system 300 and the one or more entity systems 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
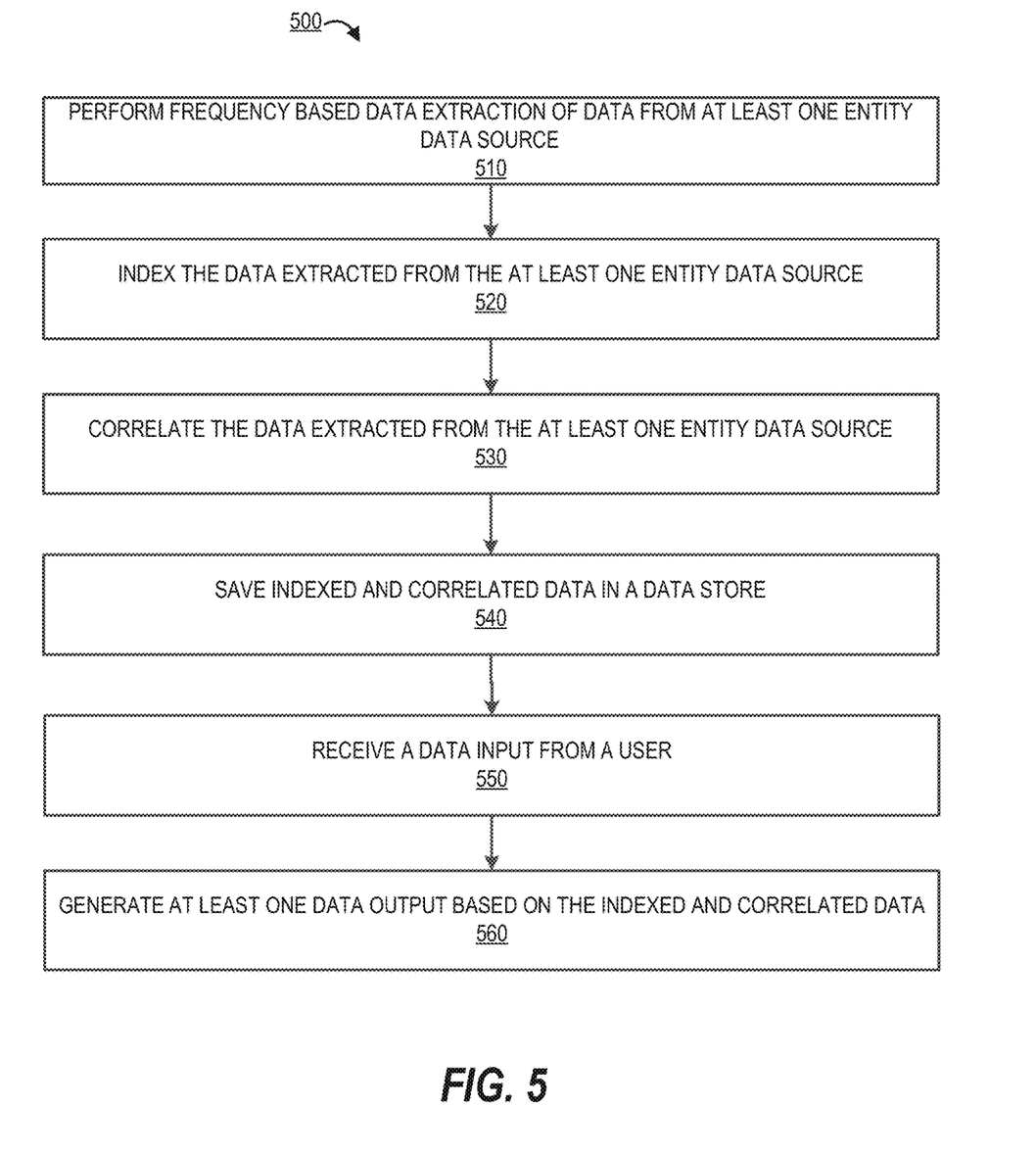
FIG. 5 provides a flowchart illustrating a process flow for building intelligent data communications, in accordance with an embodiment of the invention.

FIG. 5 provides a flowchart illustrating a process flow for building intelligent data communications, in accordance with an embodiment of the invention. Existing systems do not have the capability to provide accurate and relevant data outputs to users that are assisting other customers or users who are seeking to find information associated with an entity. The system of the present invention builds intelligent data communications with users by providing most relevant and accurate results efficiently as explained below.

As shown in block 510, the system performs frequency based data extraction of data from at least one entity data source. The at least one entity data source may be any entity system that comprises data stored in a data repository. The data (also referred to as data resources) stored in the entity system may be a document, database table, image, spreadsheet, website data, website link, information in the web site, or the like. In some embodiments, the system performs frequency based data extraction from a third party website.

In some embodiments, the frequency based extraction is performed based on identifying usage of the data, determining modification date associated with the data, determining timing associated with the creation of the data. For example, the system may determine that a piece of data was modified recently and may extract the data that was modified. In another example, the system may determine that a new piece of data was created recently and may perform extraction of that data. In yet another example, the system may determine that a piece of data was recently retrieved by a user and may extract that piece. The system may continuously look for any modifications or usage at predetermined frequencies and may perform frequency based data extraction of data. The system may use any combination of the usage, modification date, and timing associated with the creation of data to perform frequency based data extraction.

In some embodiments, the system may additionally verify the authenticity of data extracted from the at least one entity data source. The verification of authentication of the data may be based upon comparing the extracted data with other similar data extracted from other entity data sources. For example, the entity may be an organization and the data may be a document associated with personal information of a customer. Multiple entity systems may receive personal information of the customer while performing different operations (e.g., loan processing, product purchase, billing address change, or the like). In this example, the system may compare the customer's personal information stored by an entity system 'A' that facilitates product purchases with customer's personal information stored by an entity system 'B' that processes loan applications. It should be understood that the examples provided herein are for explanatory purposes only and do not delineate the scope of the invention. The system may verify the authenticity of the data based on the modification date, usage, and timing associated with the creation of the data such that the data being stored by the system is up-to-date. The system verifies the data such that no incorrect information is stored in a datastore, thereby saving the memory consumption of the system.

As shown in block 520, the system indexes the data extracted from the at least one entity. Indexing of the data allows the system to sort the data and retrieve the data efficiently. The system may use Term Frequency-Inverse Document Frequency (TF-IDF) based indexing to index the data. Term Frequency-Inverse Document Frequency indexing can be used as a weighting factor which enables faster retrieval of data. The Term Frequency-Inverse Document Frequency indexing is based on a number of times a piece data appears in multiple data resources (e.g., document, images, or the like).

As shown in block 530, the system correlates the data extracted from the at least one entity data source. The system extracts data from the at least one entity and correlates the data to get a better understanding of the data which also contributes towards fast and efficient way to retrieve correct data when required. Continuing with the previous example, the system may identify a billing statement in an entity data source with a customer ID number and another personal information document comprising the customer ID number. The system correlates the data extracted from the billing statement and the personal information document based on finding a matching parameter. In some embodiments, correlation of data comprises understanding relations between the different types of data extracted from the at least one entity data source. In some embodiments, the system may divide the data extracted from the at least one entity data source into different categories. As shown in block 540, the system saves indexed and correlated data in a data store. In some embodiments, the system may also save the raw data retrieved from the at least one entity data source.

As shown in block 550, the system receives a data input from a user. Data input may be a query or a question submitted by an employee of the entity, where the query may be related to any piece of information stored in the one or more entity systems 200 and/or third party websites. In some embodiments, the user may submit the query to the system via a user interface provided by the system. In response to receiving the data input, the system cleanses the data input and identifies tokens associated with the data input via one or more trained models in real-time. Cleansing data in some embodiments, may comprising, identifying filler words used via a natural language processing application such that the tokens can be easily identified. Tokens may be a keyword associated with the query present in the data input. Based on the identified tokens, the system maps the token with the indexed and correlated data to determine a match based on the one or more trained models.

As shown in block 560, the system generates at least one data output based on the indexed and correlated data. The system generates the at least one data output quickly and efficiently in real-time, where the data output is a response to the query in the data input. The response provided by the system is more relevant and accurate as the response is generated using the correlated data and also based on the tokens in the data input. In some embodiments, the system may utilize an artificial intelligence engine and one or more intelligent logics to identify the token, perform token and data mapping, and also to generate the at least one data output. In some embodiments, the system in response to presenting the at least one data output to the user, receives a second data input from the user, generates a second data output for the second data input based on the indexed and correlated data, and presents the second data input to the user. In some embodiments, the user may submit a feedback to the system and the system may learn via the machine learning models and/artificial intelligence engine based on the feedback provided by the user.

In some embodiments, where the entity is any organization, the system of this invention may serve users to onboard new hires, provide assistance to call center employees, provide assistance to customers, or the like. In one exemplary embodiment, if a user is hired as a multi-domain employee who works for different domains or groups within the entity, the system of the present invention may provide the user with most accurate and relevant documents, files, or the like based on gathering information from different domains. In another exemplary embodiment, the system may serve call center employees who are assisting other customers. The use cases described herein are for illustrative purposes only and do not in any way delineate the scope of the invention.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for building intelligent data communications, the system comprising:
    at least one network communication interface;
    at least one non-transitory storage device; and
    at least one processing device coupled to the at least one non-transitory storage device and the at least one network communication interface, wherein the at least one processing device is configured to:
    perform frequency based extraction of data from at least one entity data source;

index the data extracted from the at least one entity data source using Term Frequency-Inverse Document Frequency (TF-IDF) indexing;
in response to indexing the data, correlate the data extracted from the at least one entity data source;
divide the data extracted from the at least entity data source into different categories based on correlating the data;
receive a data input from a user;
in response to receiving the data input, cleanse the data input, wherein cleansing the data input comprises identifying filler words, via a natural processing application;
determine a token associated with the data input based on one or more trained models;
relate the token with correlated and indexed data to generate at least one data output; and
present the at least one data output to the user.

2. The system of claim 1, wherein the at least one processing device is configured to perform the frequency based extraction of data further comprises:
identifying usage of data;
determining modification date associated with the data; and
determining timing associated with creation of the data.

3. The system of claim 2, wherein the at least one processing device is configured to
verify authenticity of the data extracted from the at least one entity data source.

4. The system of claim 3, wherein the at least one processing device is configured to verify the authenticity of the data based on:
comparing the data extracted from the at least one entity data source with similar data extracted from other entity data sources.

5. The system of claim 4, wherein the at least one processing device is configured to compare the data extracted from the at least one entity data source with similar data extracted from the other entity data sources based on the usage, the modification date, the timing of creation associated with the data.

6. The system of claim 1, wherein the at least one processing device is configured to:
in response to presenting the at least one data output to the user, receive a second data input from the user;
generate a second data output for the second data input based on the indexed and correlated data; and
present the second data input to the user.

7. The system of claim 1, wherein the at least one processing device is configured to generate the at least one data output based on applying an intelligent logic.

8. A computer program product for building intelligent data communications, the computer program product comprising a non-transitory computer-readable storage medium having computer executable instructions for causing a computer processor to perform the steps of:
performing frequency based extraction of data from at least one entity data source;
indexing the data extracted from the at least one entity data source using Term Frequency-Inverse Document Frequency (TF-IDF) indexing;
in response to indexing the data, correlating the data extracted from the at least one entity data source;
dividing the data extracted from the at least entity data source into different categories based on correlating the data;
receiving a data input from a user;
in response to receiving the data input, cleansing the data input, wherein cleansing the data input comprises identifying filler words, via a natural processing application;
determining a token associated with the data input based on one or more trained models;
relating the token with correlated and indexed data for generating at least one data output; and
presenting the at least one data output to the user.

9. The computer program product of claim 8, wherein the computer executable instructions computer executable instructions cause a computer processor to perform the steps of performing the frequency based extraction of data is based on:
identifying usage of data;
determining modification date associated with the data; and
determining timing associated with creation of the data.

10. The computer program product of claim 9, wherein the computer executable instructions for causing a computer processor to perform the steps of verifying authenticity of the data extracted from the at least one entity data source.

11. The computer program product of claim 10, wherein the computer executable instructions for causing a computer processor to perform the steps of verifying the authenticity of the data based on comparing the data extracted from the at least one entity data source with similar data extracted from other entity data sources.

12. The computer program product of claim 8, wherein the computer executable instructions for causing a computer processor to perform the steps of:
in response to presenting the at least one data output to the user, receiving a second data input from the user;
generating a second data output for the second data input based on the indexed and correlated data; and
presenting the second data input to the user.

13. A computer implemented method for building intelligent data communications, the method comprising:
performing frequency based extraction of data from at least one entity data source;
indexing the data extracted from the at least one entity data source using Term Frequency-Inverse Document Frequency (TF-IDF) indexing;
in response to indexing the data, correlating the data extracted from the at least one entity data source;
dividing the data extracted from the at least entity data source into different categories based on correlating the data;
receiving a data input from a user;
in response to receiving the data input, cleansing the data input, wherein cleansing the data input comprises identifying filler words, via a natural processing application;
determining a token associated with the data input based on one or more trained models;
relating the token with correlated and indexed data for generating at least one data; and
presenting the at least one data output to the user.

14. The computer implemented method of claim 13, wherein performing the frequency based extraction of data comprises:
identifying usage of data;
determining modification date associated with the data; and
determining timing associated with creation of the data.

15. The computer implemented method of claim 14, wherein the method further comprises verifying authenticity of the data extracted from the at least one entity data source.

16. The computer implemented method of claim 15, wherein verifying the authenticity of the data is based on comparing the data extracted from the at least one entity data source with similar data extracted from other entity data sources.

17. The computer implemented method of claim 13, wherein the method further comprises:
   in response to presenting the at least one data output to the user, receiving a second data input from the user;
   generating a second data output for the second data input based on the indexed and correlated data; and
   presenting the second data input to the user.

* * * * *